United States Patent
Yates et al.

(10) Patent No.: US 8,337,598 B2
(45) Date of Patent: Dec. 25, 2012

(54) PHOTO-CROSSLINKED GAS SELECTIVE MEMBRANES AS PART OF THIN FILM COMPOSITE HOLLOW FIBER MEMBRANES

(75) Inventors: Stephen F. Yates, Arlington Heights, IL (US); Matthew C. McGuirl, Chicago, IL (US); Tihomir G. Tonev, Elmwood Park, IL (US); Chunqing Liu, Schaumburg, IL (US); Jeffrey Chiou, Irvine, CA (US); Amber Arzadon, Chicago, IL (US)

(73) Assignee: Honeywell International Inc., Morristown, NJ (US)

( * ) Notice: Subject to any disclaimer, the term of this patent is extended or adjusted under 35 U.S.C. 154(b) by 864 days.

(21) Appl. No.: 12/205,552

(22) Filed: Sep. 5, 2008

(65) Prior Publication Data
US 2010/0058926 A1    Mar. 11, 2010

(51) Int. Cl.
*B01D 53/22*    (2006.01)
(52) U.S. Cl. ............... 96/10; 95/43; 96/4; 96/8; 55/527
(58) Field of Classification Search ............ 96/4, 8, 96/10; 95/43; 55/527
See application file for complete search history.

(56) References Cited

U.S. PATENT DOCUMENTS

| | | | |
|---|---|---|---|
| 4,281,100 A * | 7/1981 | Takekoshi | 528/188 |
| 5,599,380 A * | 2/1997 | Koros | 95/54 |
| 5,783,079 A * | 7/1998 | Kumano et al. | 210/500.23 |
| 5,814,372 A * | 9/1998 | Moya | 427/245 |
| 6,663,805 B1 | 12/2003 | Ekiner et al. | |
| 6,730,145 B1 * | 5/2004 | Li | 96/10 |
| 6,805,730 B2 | 10/2004 | Herczeg | |
| 6,991,887 B1 * | 1/2006 | Grate et al. | 430/270.1 |
| 7,018,445 B2 | 3/2006 | Simmons | |
| 7,025,804 B2 * | 4/2006 | Simmons et al. | 95/51 |
| 7,109,140 B2 | 9/2006 | Marand | |
| 7,758,751 B1 * | 7/2010 | Liu et al. | 210/321.6 |
| 2003/0126990 A1 * | 7/2003 | Koros et al. | 96/10 |
| 2006/0011063 A1 | 1/2006 | Zhou | |
| 2006/0156920 A1 * | 7/2006 | Ekiner et al. | 95/45 |
| 2006/0231485 A1 | 10/2006 | Yoshinaga | |
| 2006/0266217 A1 | 11/2006 | Jensvold | |
| 2007/0022877 A1 * | 2/2007 | Marand et al. | 95/51 |

OTHER PUBLICATIONS

Dong et al. ("Preparation of Polyvinylamine/Polysulfone Composite Hollow-Fiber Membranes and Their CO2/CH4 Separation Performance") Journal of Applied Polymer Science, vol. 101, 1885-1891 (2006).*

* cited by examiner

*Primary Examiner* — Jason M Greene
*Assistant Examiner* — Anthony Shumate
(74) *Attorney, Agent, or Firm* — Shimokaji & Assoc., PC (57) ABSTRACT

A thin film composite membrane comprises a core layer and a sheath UV-crosslinked polymer layer. The thin film composite membrane is produced by the co-extrusion of two polymer solutions. The core layer and the sheath layer can be separately optimized. The sheath layer may be UV-crosslinked to provide stability and selectivity at the desired operating temperature of the composite membrane.

12 Claims, 6 Drawing Sheets

PHOTO-CROSSLINKED GAS SELECTIVE MEMBRANES AS PART OF THIN FILM COMPOSITE HOLLOW FIBER MEMBRANES

BACKGROUND OF THE INVENTION

The present invention generally relates to air separation membranes and, more particularly, to photo-crosslinked hollow fiber membranes for use in air separation modules (ASMs).

ASMs are the key component for the nitrogen generation systems (NGS) needed to provide fuel tank inerting for commercial and military aircraft. Useful membranes for separating oxygen from nitrogen must have sufficient selectivity to distinguish between these two similar gases, and must also have high flux. Since flux determines the size and weight of the ASM needed for a given product flow, maximizing flux is key to fitting the ASM into the aircraft.

Flux is generally quantified as either permeance or permeability. Permeance, measured in Gas Permeation Units (GPU), is the flow of gas through the membrane at standard temperature and pressure (STP), divided by the membrane area and the trans-membrane pressure drop: $1 \text{GPU} = 10^{-6} \text{ cm}^3$ (STP)/$\text{cm}^2$ S (cm Hg). Permeability, measured in Barrer, is the flow, multiplied by the membrane thickness and divided by membrane area and pressure drop: $1 \text{ Barrer} = 10^{-10} \text{ cm}^3$ (STP) $\text{cm/cm}^2$ s (cm Hg). Flow through the membrane will increase with increasing membrane area or trans-membrane pressure drop, and will decrease with increased membrane thickness.

Membranes for use in the fuel tank inerting systems of commercial aircraft have special requirements. The air used as the feed to the membrane system will frequently come from the engines as a "bleed air" stream. The temperature of this stream may be higher than 300° C. It is therefore cooled before introduction into the membrane. The size of the cooling system and the volume of coolant should be minimized to reduce weight in the aircraft, so the membrane system will be operated at as high a temperature as possible, generally at least 140° F., and more commonly 200-250° F. Even higher temperatures are desired. The inlet air will commonly contain ozone since the ozone concentration in air increases with altitude, and may contain hydrocarbons from either the environment around the aircraft or from the engine itself. The membrane must tolerate these contaminants. Finally, the membrane module must have a long useful life without requiring maintenance, and should be very reliable. These requirements rule out many common materials of construction for air separation membranes, and make many commercially available membranes unsuitable for the aircraft application.

Obviously, to make membranes which have as high flux as possible, one wishes to make the membrane very thin. Since a thin membrane would also be very fragile, most membranes are anisotropic, and have a very thin selective layer, supported on a porous support. There are two basic types of anisotropic membranes, the asymmetric, or Loeb-Sourirajan, membrane in which the selective layer and the support have the same chemical structure, and the thin film composite membrane, in which they are different.

U.S. Patent Application No. 2006/0011063 discloses a gas separation membrane formed from polyetherimide by extruding a hollow fiber using a core liquid. For the described membrane, like other asymmetric hollow fiber membranes, one polymer solution is spun from an annular spinneret and the core liquid is pumped into the center of the annulus. Generally, the nascent hollow fiber membrane passes through an air gap into a nonsolvent coagulation bath, followed by wind-up on a drum, roll or other suitable device. The fiber velocity is accelerated in the air gap from the extrusion velocity at the spinneret exit to the wind-up velocity of the drum. The wind-up velocity is usually adjusted to elongate the fiber and to draw down the diameter of the nascent fiber in the air gap to the desired finished fiber diameter. Generally, increasing the wind-up velocity increases fiber surface area and reduces fiber outer diameter (OD). "Draw ratio" is a commonly used parameter for characterizing the degree of extensional deformation that the fiber experiences in the air gap and is the ratio of wind-up velocity to the average extrusion velocity. The coagulant fluid leaches solvent from the annular stream to form a denser region near the outside surface of the fiber that becomes the selective layer of the fiber, while the bulk of the fiber becomes porous. Since only one polymer solution is used for asymmetric membranes, the polymer must fulfill all of the requirements for the fiber, including low cost, high permeance, high selectivity, mechanical strength etc.

U.S. Pat. No. 6,805,730 discloses porous hollow fiber membranes having convoluted inside and/or outside surfaces. The convoluted surfaces increase flux by increasing the surface area of the fiber. The preferred membranes are described as integral, i.e., they do not have a plurality of layers laminated together. In a more preferred embodiment, the integral membrane is all of one composition. Although the described fibers may provide increased surface area and increased flow through the fiber, the described membranes are asymmetric membranes wherein one polymer solution fulfills all the requirements of the fiber.

In contrast to asymmetric membranes, thin film composite membranes include more than one polymer solution. For thin film composite membranes, one polymer is used to create the porous bulk of the fiber (core), while a second polymer is coated on the surface and becomes the selective layer (sheath). Now the bulk polymer can form a mechanically strong porous fiber, while the thin film polymer can have high permeance and selectivity. Separating these requirements using thin film composite membranes allows many more polymers to be used than in the asymmetric approach. The thin film polymer may be applied after formation of the porous membrane fiber by techniques such as dipping, casting, or interfacial polymerization, or it may be applied by co-extrusion during spinning of the fiber. In other words, thin film composite hollow fibers may be made by coating a polymeric film onto an already made core membrane fiber, by doing a polymerization on the surface of an already made core fiber, or by co-extruding the core and sheath layers comprising different polymers simultaneously into the water bath.

U.S. Pat. No. 6,663,805 discloses a process for making hollow fiber mixed matrix membranes. The '805 patent describes both asymmetric and composite membranes. The mixed matrix membranes are characterized by a continuous phase of selectively gas permeable polymer in which are uniformly dispersed discrete absorbent particles such as molecular sieves that also have selectivity enhancing properties. The fibers of the '805 patent can be monolithic in which the fiber wall is entirely mixed matrix, or composite in which an active mixed matrix layer is positioned adjacent to a supporting substrate layer. It was noted that permeance increased gradually up to draw ratio of 6.2 and increased at slightly higher rate for draw ratio of 7.4. Fiber deformation resulting from draw down is said to be beneficial because it provides increased surface area for permeation per unit volume of the hollow fiber module. Although the absorbent particles may enhance fiber selectivity, they add complexity and cost to membrane production. Although increasing draw ratio may increase permeance, still further increases are needed for some applications.

As can be seen, there is a need for improved air separation membranes. Membranes are needed wherein the core layer and the sheath layer can be optimized separately. A low cost separation membrane having high permeance, high selectivity and operability at high temperatures is needed.

SUMMARY OF THE INVENTION

In one aspect of the present invention, a thin film composite hollow fiber membrane comprises a porous core polymer layer comprising at least one polymer; and a sheath crosslinked polymer layer adjacent to the porous core polymer layer, wherein the sheath crosslinked polymer layer has a thin nonporous selective layer and comprises at least one crosslinked polymer different from the at least one polymer in the porous core polymer layer.

In another aspect of the present invention, a thin film composite hollow fiber gas separation membrane comprises a porous core polymer layer; and a sheath UV-crosslinked polymer layer positioned radially outward from the porous core polymer layer, wherein the sheath UV-crosslinked polymer layer has a thin nonporous selective layer and comprises at least one UV-crosslinked polymer different from a polymer in the the porous core polymer layer.

In a further aspect of the present invention, a method of producing a thin film composite hollow fiber membrane comprises the steps of passing a bore liquid through a central bore orifice of a triple orifice spinneret; passing a core layer solution through an inner annular orifice of the triple orifice spinneret; passing a sheath layer solution through an outer annular orifice of the triple orifice spinneret to form a nascent fiber; passing the nascent fiber through an air gap and into a bath to provide a formed fiber; and irradiating the formed fiber with a UV energy source to form said thin film composite hollow fiber membrane having a sheath UV-crosslinked polymer layer positioned radially outward from said core layer.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides composite air separation membranes, and methods for producing the membranes. Embodiments of the present invention may find beneficial use in industries such as the automotive, electricity generation and aerospace industries. Embodiments of the present invention may be beneficial in applications including manufacturing and repair of aerospace components. Embodiments of the present invention may be useful in applications including inerting fuel tanks and other compartments, such as cargo holds. Embodiments of the present invention may be useful in any gas separation application including, but not limited to, NGS.

In one embodiment, the present invention provides thin film composite hollow fiber membranes made by co-extrusion of two polymer solutions and a bore liquid solution through a triple orifice spinneret. Unlike the prior art asymmetric membranes that use one polymer solution for both the bulk and separating layers, embodiments of the present invention may use one polymer solution for the core layer (bulk layer) and another polymer solution for the sheath layer (separating layer). By using separate polymer solutions, the core layer and the sheath layer can be separately optimized.

Figure 1:
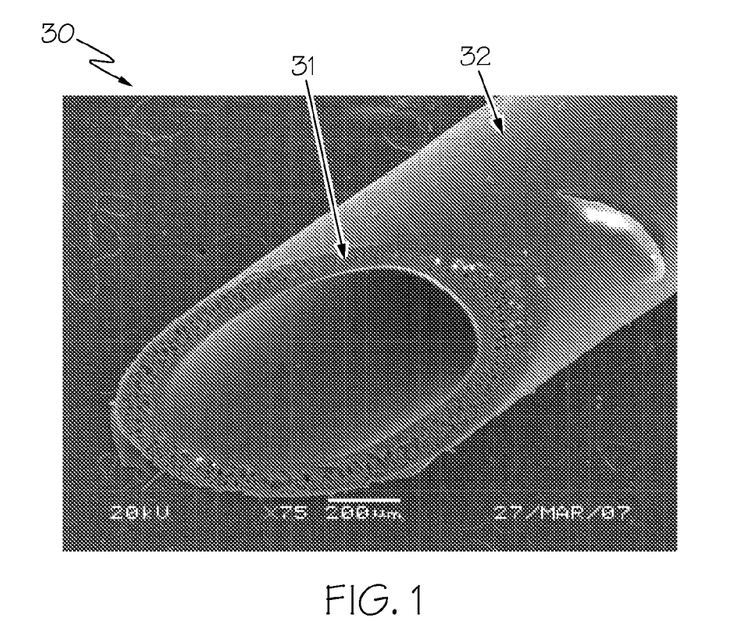
FIG. 1 is a scanning electron microscopy (SEM-EDX) image of a hollow fiber membrane according to one embodiment of the present invention.
Figure 2:
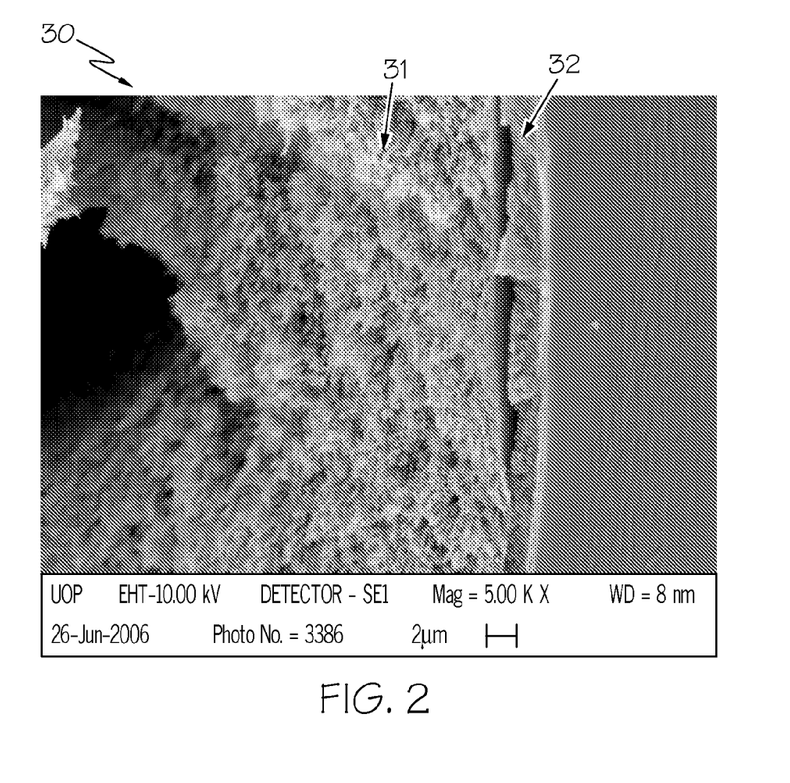
FIG. 2 is a SEM image of a portion of a hollow fiber membrane according to one embodiment of the present invention.

A gas separation membrane 30, according to an embodiment of the present invention, is shown in FIGS. 1 and 2. The gas separation membrane 30 can be a hollow fiber shaped structure and can comprise a core layer 31 and a sheath layer 32 adjacent to the core layer 31. For some applications, the core layer 31 may be positioned radially inward from the sheath layer 32. For some applications, the core layer 31 (bulk layer) may be positioned radially outward from the sheath layer 32 (separating layer). The core layer 31 and the sheath layer 32 each may have a glass transition temperature above 300° F. to provide the gas separation membrane 30 with good high temperature stability.

Figure 3:
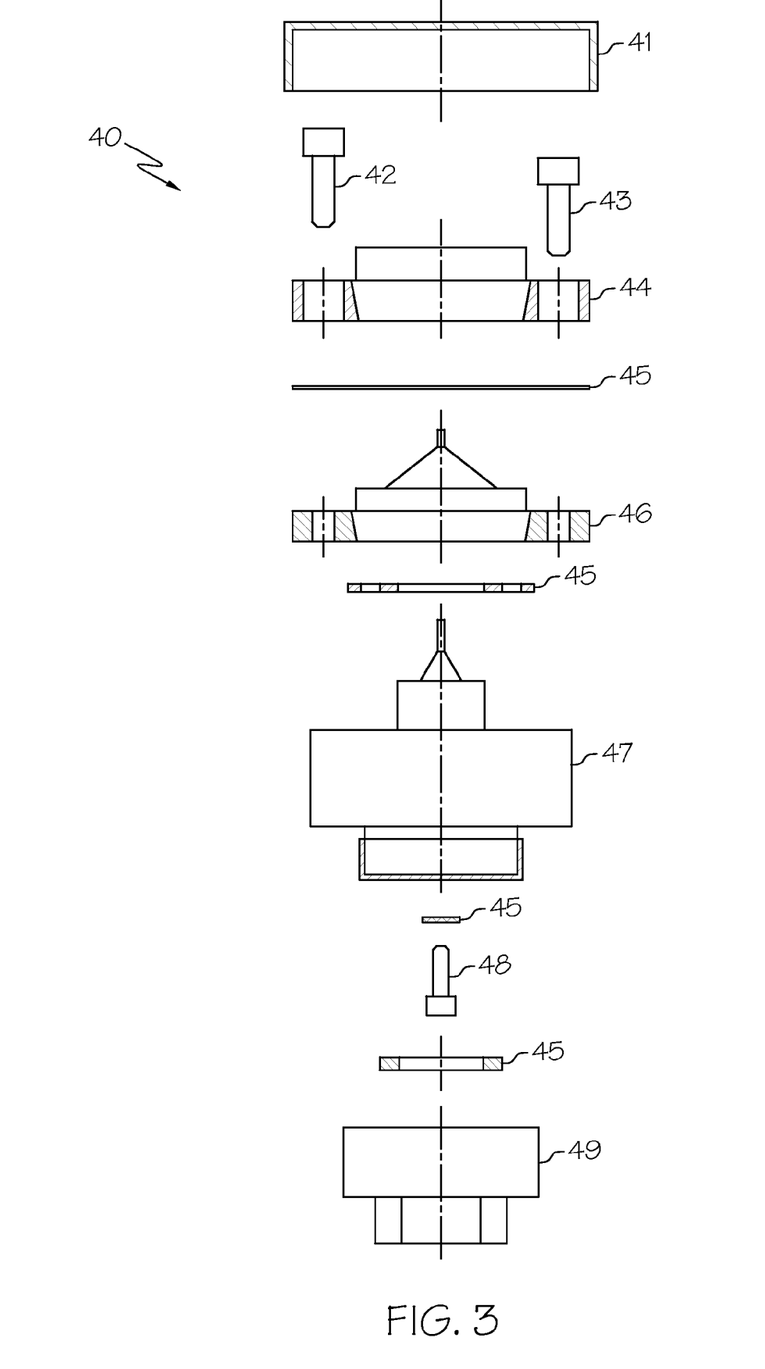
FIG. 3 is an exploded view of a triple orifice spinneret according to one embodiment of the present invention.

The gas separation membrane 30 can be spun from a triple orifice spinneret 40 (see FIG. 3) via a co-extrusion technique. The triple orifice spinneret 40, as depicted in FIG. 3, may comprise a cover 41, a small-head bolt 42, a big-head bolt 43, a spinneret outer body 44, at least one gasket 45, a spinneret mid-body 46, a spinneret main-body 47, a sealing screw 48, and a transition junction 49. For some embodiments, useful spinnerets 40 may include the spinnerets described in U.S. Pat. No. 5,320,512, which is incorporated herein by reference.

The gas separation membrane 30 may be prepared by using the triple orifice spinneret 40. The triple orifice spinneret 40 may include three concentric orifices (not shown)—a central bore orifice, an inner annular orifice and an outer annular orifice. The inner annular orifice may surround the central bore orifice and the outer annular orifice may surround the inner annular orifice. In general, a bore fluid may be forced through the central bore orifice, while two polymer solutions may be forced through the inner and outer annular orifices. These fluids each may be solutions of a polymer in a solvent or mixture of solvents. As in the asymmetric membrane procedure, the viscous but fluid stream leaving the triple orifice spinneret 40 may fall into a coagulant bath where the solvents are leached out, generating the gas separation membrane 30.

As a general overview of one embodiment of the present invention, a bore fluid comprising of a mixture of N-methylpyrrolidone (NMP) and water may be flowed through the central bore orifice. A core layer solution comprising 30% solution of Ultem® polyetherimide or polyethersulfone in NMP may be flowed through the inner annular orifice. A sheath layer solution may comprise a UV-crosslinkable polymer having UV-absorbing moiety which may initiate the cross-linking event and an alkyl substituent which may react with the UV-absorbing moiety. The sheath layer may be, for example, a UV-crosslinkable polyimide which may be flowed through the outer annular orifice. For some embodiments, the polymer concentration of the sheath layer solution may be between about 10% and about 20%. The nascent fiber formed by the combination of these three flows may fall from the triple orifice spinneret 40 a short distance (about 1-10 cm) into a bath of water, and may be drawn under a series of rollers or cylindrical guides and then onto a take up roller. The core and sheath polymers are insoluble in water, and as the water permeates the nascent fiber, and the organic solvents in the polymer solutions leach out, the polymer precipitates, forming a durable fiber. This fiber may be rinsed with water to further remove the solvents, and then may be soaked in succession in three baths of methanol, followed by three baths of hexane, to remove any trace of NMP. Finally the fibers may be heated to remove residual solvent. The sheath layer of the formed fibers may be UV-crosslinked under UV radiation to further improve the selectivity of the fibers. Optionally, fibers may be dip-coated with a layer of polydimethylsiloxane or a cross-linked silicone coating which serves to plug any pinholes which may have formed in the process.

The gas separation membrane 30 resulting from this process may be hollow fiber shaped and have a porous core layer 31 surrounded by a less porous sheath layer 32. The sheath layer 32 itself may have a gradation of porosity, as shown in FIG. 2, with the underlying portions being relatively porous, while the outside skin will be tighter. It is this outside skin which may be responsible for the greatest amount of selectivity, but it may be important that this skin be kept very thin to increase permeance. For some embodiments, the gas separation membrane 30 may have a permeance of at least 60 GPU.

The core layer 31 may comprise a polymer such as a high temperature thermoplastic polymer. The polymer of the core layer 31 may have moderate cost, since it may constitute the bulk of the gas separation membrane 30. The polymer of the core layer 31 may have a glass transition temperature above 300° F., high oxidative stability and may resist fouling by hydrocarbons, ozone or other expected air contaminants. The core layer 31 may be mechanically strong and have a flux much greater than that required for the overall gas separation membrane 30.

The core layer 31 may comprise a polyetherimide such as Ultem®1000 available from General Electric. Useful polyetherimides may include the polyetherimides described in U.S. Pat. No. 4,156,597, which is incorporated herein by reference. For some applications, the core layer 31 may include other polymers that are soluble in water-miscible solvents, such as polysulfones, polyethersulfones, and polyimides. For some embodiments, useful core polymers may include polysulfones, polyimides, polycarbonates, polyphenyl ethers, polyethers, aromatic polyamides, polycarbonates, polyethersulfones, polysilicones, polyetherimides, polyestercarbonates, copolymers incorporating these polymer types, and mixtures thereof. For some embodiments, the core layer 31 may comprise a polysulfone such as Udel® 1800 or a polyphenylsulfone such as Radel®, available from Solvay.

Figure 4:
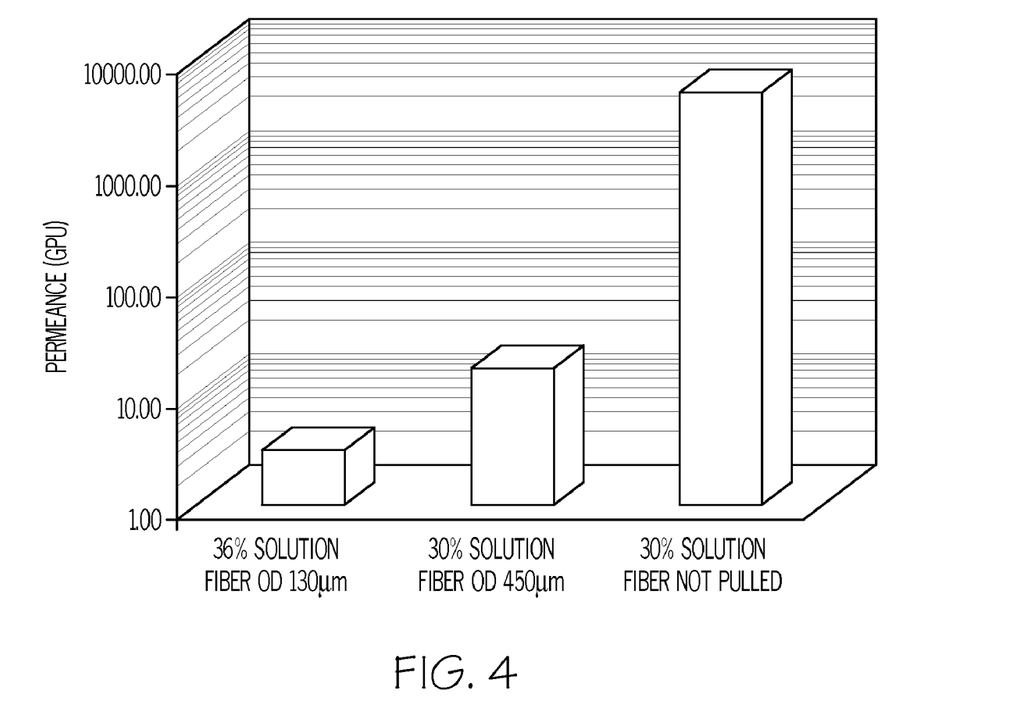
FIG. 4 is a plot of permeance as a function of polymer concentration and fiber outer diameter according to one embodiment of the present invention.

Because the core layer 31 may form the bulk of the gas separation membrane 30, the focus may be on increasing the permeance, while allowing the selectivity to decrease. Permeance may depend on factors including polymer concentration, fiber surface area and fiber OD. FIG. 4 is plot of permeance as a function of polymer concentration and fiber outer diameter. Permeance increased as the polymer concentration was reduced from 36% down to 30%. The key variable, however, turned out to be the take up roller speed. Initially, this roller was operating at a speed that drew down the fiber from its initial dimensions (comparable to the dimensions of the triple orifice spinneret 40 (about 600 microns) to a final O.D. of 130 microns. As the roller speed was decreased, the fiber O.D. increased, and so did the permeance. When the roller speed was decreased to the point that some slack was present in the water bath, the permeance increased by orders of magnitude. FIG. 4 shows this result. This result contrasts with the prior art where permeance increased with increased wind-up rate.

Figure 5A:
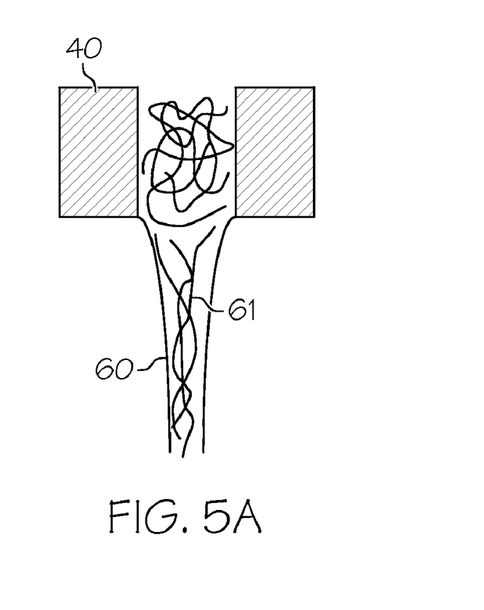
FIG. 5a is a plan view of a fiber that is drawn during coagulation according to one embodiment of the present invention.
Figure 5B:
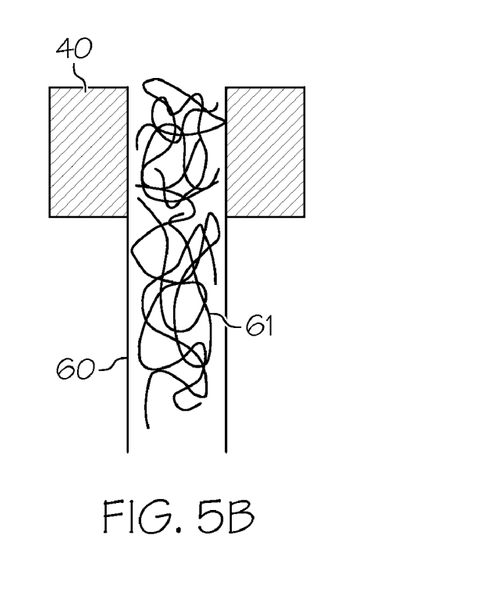
FIG. 5b is a plan view of a fiber that is not drawn during coagulation according to one embodiment of the present invention.

As a non-limiting theory, we can see why this effect would be important. The Ultem® polymer may be relatively inflexible and rod-like, and a plurality of polymer chains 61 (see FIGS. 5a-b) may have been randomly oriented in the spinning mixture. As the mixture is spun, there may be a tendency for the polymer chains 61 to orient parallel to the flow direction and drawing a fiber 60 may exacerbate this effect, as shown in FIGS. 5a-b. A fiber 60 that is drawn during coagulation is depicted in FIG. 5a and a fiber 60 that is not drawn during coagulation is depicted in FIG. 5b. Recalling that the mechanism for permeation through a high glass transition polymer like polyimide will be diffusion, we can see that any tendency of the polymer chains 61 to become more organized will decrease the voids between adjacent chains 61 and decrease permeance. In FIG. 5a, the fiber 60 is drawn during coagulation, has oriented polymer chains 61 and low permeance. In FIG. 5b, the fiber 60 is not drawn during coagulation, has random polymer chains 61 and high permeance. Although the conditions for spinning the core layer 31 may vary with application and may depend on the composition of the sheath later 32, the conditions for spinning one embodiment of the core layer 31 are shown in Table 1.

TABLE 1

| Core Polymer | | Ultem |
|---|---|---|
| Polymer concentration | % | 30 |
| NMP/TEG ratio | | 8.1 |
| Spinning rate | g/min | 0.5 |
| Spinning pressure | psig | 120 |
| Die Temp | ° C. | RT |
| Speed | rpm | free falling |
| Core Rate | Ml/min | 0.2 |
| Bore liquid composition | | 5% H2O in NMP |
| Height of spinneret above water | in | 0.75 |
| Bath Temp | ° C. | 22.8 |
| Fiber ID | mm | 0.3 |
| Fiber OD | mm | 0.5 |
| O2 Permeance | GPU | 3440 |
| Core Polymer rate | g/sec | 0.0025 |
| Fiber production rate | cm/s | 3.00 |

The sheath layer 32 may provide the characteristic of separating oxygen from nitrogen, and may have a high permeance for oxygen. The sheath layer 32 may comprise a polymer which has a glass transition temperature above 300° F. The sheath layer 32 may comprise a polymer that is soluble in water-miscible solvents. The sheath layer 32 may comprise only a small percentage of the total weight of the gas separation membrane 30, so it may be quite expensive without increasing the cost of the gas separation membrane 30 significantly. For some embodiments, the sheath layer 32 may comprise between about 5% and about 20% by weight of the gas separation membrane 30. For some embodiments, the sheath layer 32 may be between about 0.1 and about 3 microns in thickness.

For some embodiments, the sheath layer 32 may comprise a UV-crosslinkable polymer having UV-absorbing moiety which may initiate the cross-linking event and an alkyl substituent which may react with the UV-absorbing moiety. The UV-absorbing moiety may be, for example, aryl ketones with UV extinction coefficients above about $100M^{-1}cm^{-1}$ at 254 nm. In one embodiment, the UV absorbing group may be derived from benzophenonetetracarboxylic anhydride, while the alkl groups may be methyl groups on the diamine4,4'-methylenebis(2,6-dimethylaniline). This polymer is referred to as Polymer A. Typically, the alkyl substituents may be a $C_1$-$C_8$ straight or branched-chain saturated hydrocarbon group on an aromatic moiety. More generally, the alkyl substituent may be a $C_1$-$C_8$ straight or branched-chain saturated hydrocarbon group on any group which will activate hydrogens adjacent to the group to free-radical abstraction. It will be understood by those skilled in the art that in making a polyimide using these precursors, other precursors may be added. For example, a second or third dianhydride may be added to modulate the properties of the polyimide, or a second or third diamine. The only essential characteristic of the photo-crosslinkable sheath polymer is that it contain at least 20% by volume of the UV-absorbing group, and 20% by volume of a moiety bearing the alkyl substituent. Other examples of UV-absorbing groups include diphenylsulfones, diphenylsulfoxides, 2,3-dihydrofuran, styrenic, acrylic, or groups containing more than one fused aromatic ring.

Typically, the sheath layer 32 may include any type of UV-crosslinkable rigid, glassy polymers with glass transition temperatures above 300° F. The UV-crosslinkable rigid, glassy polymers described in the present invention may include polymer chain segments wherein at least a part of these polymer chain segments can be UV-crosslinked to each other through direct covalent bonds by utilizing UV radiation. The UV-crosslinkable polymers described in the present invention can be selected from any polymers containing UV-crosslinkable benzophenone, acrylic, vinyl, styrenic, styrenic-acrylic, sulfonic, 2,3-dihydrofuran group or mixtures of these groups. For some applications, the sheath layer 32 may include the UV-crosslinkable polyethersulfones, polyimide Matrimid® 5218, polyimides obtained by the co-polymerization of monomers such as 4,4'-hexafluoroisopropylidene diphthalic anhydride (CAS 11007-00-2), 3,3',4,4'-biphenyltetracarboxylic anhydride (2420-87-3), or pyromellitic dianhydride (89-32-7) with various aromatic amines. The amines may include 4,4'-diaminodiphenylmethane (101-77-9) and 4,4'-Oxydianiline (101-80-4).

For some embodiments, the sheath layer 32 may comprise a UV-crosslinkable polyimide derived from an anhydride and a diamine. Useful UV-crosslinkable polyimides may be, for example a polyimide prepared from equal amounts of pyromelitic dianhydride (PMDA) and 3,3',4,4'-benzophenonetetracarboxylic anhydride (BzPDA) and 4,4'-methylenebis(2,6-dimethylaniline) (TMDADM).

For some embodiments, the polyimides chosen for the sheath layer 32 may not commercially available and it may be necessary to prepare these polymers. This synthesis is relatively easy and a summary of the chemical reactions involved is shown in Scheme 1.

-continued

The synthesis may involve two steps. In the first, the anhydride (in this case 3,3',4,4'-benzophenone tetracarboxylic dianhydride (BTDA), and the diamine (in this case 4,4'-diaminodiphenyl-methane (DADM) are mixed at room temperature in NMP solution. This produces the intermediate polyamic acid product. To complete polyimide preparation, a dehydrating agent, acetic anhydride, is added along with triethylamine to scrub the resulting acid, generating the final polyimide. This final step is done portionwise, and is accompanied by a significant increase in viscosity. Once further addition of acetic anhydride was no additional effect, the product is precipitated by removing it with a pipette and adding it to excess methanol. The value of doing the precipitation in this way is that the precipitated polymer forms long strands which are relatively easy to wash and dry, and which redissolve more easily for use.

The synthesis of a polymer nicknamed "Polymer B" is shown in Scheme 2. Polymer B is a 50-50 mixture of two 3,3',4,4'-benzophenonetetracarboxylic dianhydride and pyromellitic dianhydride with the unusual diamine 4,4'-diamino-3,3',5,5'-tetramethyldiphenylmethane.

Scheme 2

BP-55

The synthesis, as shown in Scheme 2, uses two steps in a single reactor. A mixture of the two dianhydrides is added to a solution of the diamine to make a polyamic acid, and then acetic anhydride and an amine are added to dehydrate the polyamic acid to the polyimide. Purification of the diamine may be necessary to get a sufficiently high polymer molecular weight.

Other methods of crosslinking may also be used to gain the same benefits as those described for UV crosslinking. In particular, these include crosslinking of polyimides by the use of crosslinking reagents such as diamines. Another method for crosslinking may depend on the conversion of the polyamide to the polyimide being less than 100%. If such a sheath polymer is used to prepare a hollow fiber membrane, which is then heated, the residual amine and acid moieties may react, creating crosslinks.

Figure 6:
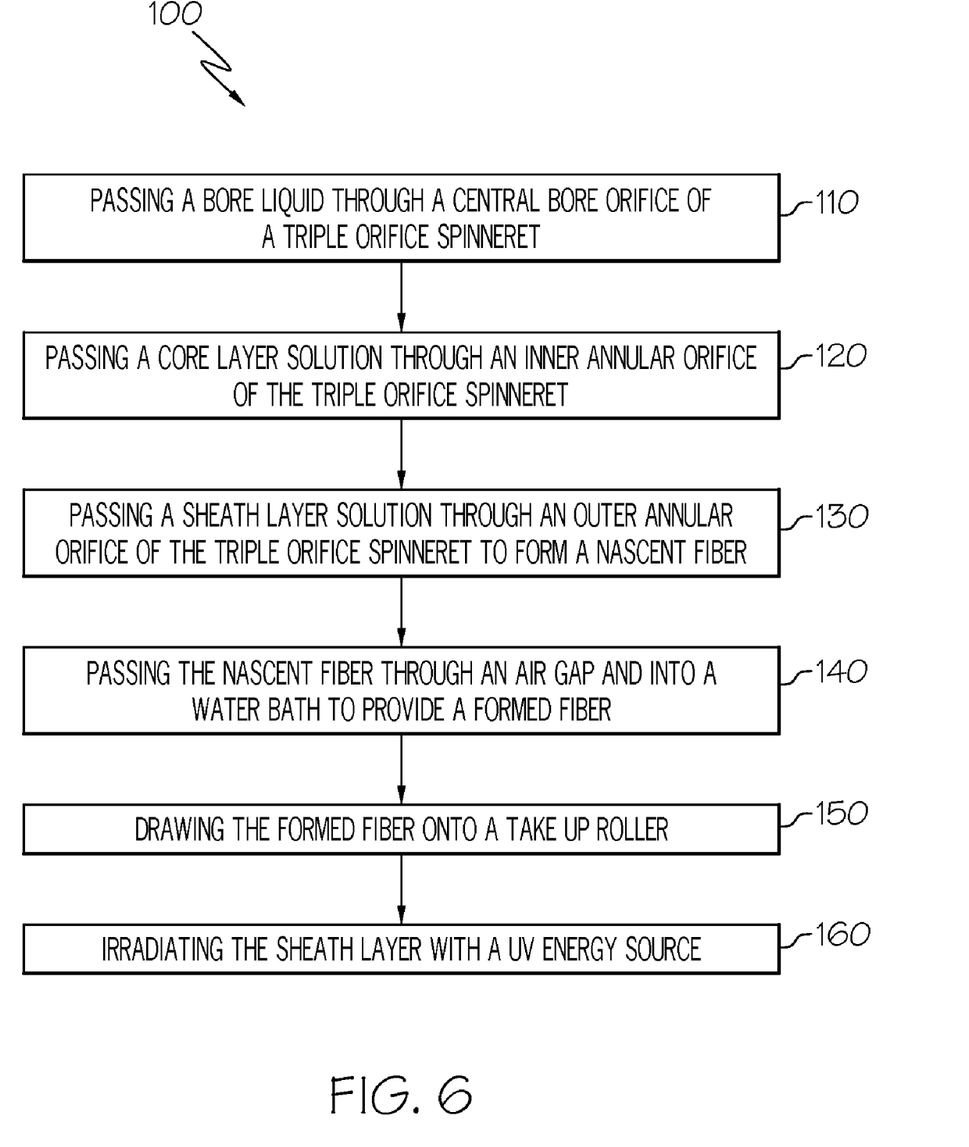
FIG. 6 is a flow chart of a method of producing a gas separation membrane according to an embodiment of the present invention.

A method 100 of producing a gas separation membrane is depicted in FIG. 6. The method 100 may comprise a step 110 of passing a bore liquid through a central bore orifice of a triple orifice spinneret 40, a step 120 of passing a core layer solution through an inner annular orifice of the triple orifice spinneret 40, and a step 130 of passing a sheath layer solution through an outer annular orifice of the triple orifice spinneret 40 to form a nascent fiber. The method 100 may further comprise a step 140 of passing the nascent fiber through an air gap and into a water bath and a step 150 of drawing the fiber onto a take up roller. Finally, the method 100 may further comprise a step 160 of irradiating the sheath layer with a UV energy source.

The step 110 of passing a bore liquid through a central bore orifice of a triple orifice spinneret 40 may comprise passing a mixture of N-methylpyrrolidone and water the central bore orifice. The step 120 of passing a core layer solution through a inner annular orifice of the triple orifice spinneret 40 may comprise passing a 30% solution of Ultem® polyetherimide in NMP through the inner annular orifice. The step 130 of passing a sheath layer solution through an outer annular orifice of the triple orifice spinneret 40 may comprise passing a solution including a 50-50 mixture of two 3,3',4,4'-benzophenonetetracarboxylic dianhydride and pyromellitic dianhydride with 4,4'-diamino-3,3',5,5'-tetramethyldiphenylmethane. The step 150 of drawing the formed fiber onto a take up roller may include decreasing the roller speed to a point where some slack is present in the fiber. The step 160 of irradiating the sheath layer with a UV energy source may include irradiation with a UV-C lamp, such as a mercury arc lamp. Typically, the intensity of the UV energy source may be about 2 mW/cm$^2$. The irradiation time is typically from about 1 to about 50 minutes.

EXAMPLE 1

Thin film composite hollow fiber membranes were cast using Ultem for the core polymer and Matrimid polyimide as the sheath polymer. A table of spinning conditions is shown in Table 2. The SEM image in FIG. 2 shows a gas separation membrane 30 using Matrimid for the sheath layer 32. The photo is of one side of a single hollow fiber, with the central hole visible on the left edge. The bulk of the fiber (core layer 31) is comprised of Ultem, and shows very good morphology with lots of very small pores and few if any large voids. In this photo the core layer 31 is 90 microns thick. The sheath layer 32 is laid on top of this, and appears to be about 2 microns thick. For some embodiments, the thickness of the sheath layer 32 may be between about 0.1 and about 3 microns. Careful inspection shows that the sheath layer 32 is itself asymmetric, with more porosity toward the center of the fiber, and less toward the edge. It can estimate that the actual selective layer may be only 500 nm thick.

EXAMPLE 2

Two solutions are prepared, one for the core layer and one for the sheath layer. The core is Ultem polyetherimide. Alternately, the core may be Ultrason polyethersulfone. The core polymer is typically dissolved in NMP, optionally containing a nonsolvent such as ethanol or triethylene glycol. The sheath polymer is polymer C which is a UV-crosslinkable polyimide synthesized from a mixture of three dianhydride monomers 3,3',4,4'-benzophenone tetracarboxylic dianhydride, pyromellitic dianhydride, and 4,4'-oxydiphthalic anhydride and one diamine monomer 3,3',5,5'-tetramethyl-4,4'-methylene dianiline dissolved in a blend of solvents adjusted to be near its solubility limit. NMP is a major component of this solvent, and 1-3-dioxolane, acetone and methanol are also used. The two polymer solutions are forced through a spinneret as described above, into a water bath where coagulation occurs. The resultant fiber is solvent exchanged with methanol and then hexanes, and dried. The resultant dried fiber is then UV treated. After module formulation, defects in the fiber can optionally be sealed using a post-treatment coating of silicone.

EXAMPLE 3

In order to understand the intrinsic gas separation characteristics of some of the polymers used as sheath or core materials, dense film permeabilities were measured. Samples were prepared by dissolving each polymer separately in a volatile solvent, then allowing the solvent to evaporate to make a dense film. A dense film circle with ~50 μm thickness and 9-10 cm² testing area was mounted in a dense film testing cell. One face of this film was exposed to air at the indicated pressure in Table 5, while the other face was exposed to a closed vessel which had been placed under vacuum. The rate at which gases permeated the film and therefore increased the pressure inside the vessel was recorded. GC analysis was used to determine the $O_2$ and $N_2$ compositions in the feed air gas and the permeate gas, so that the $O_2/N_2$ selectivity can be calculated.

Table 5, below, shows that Polymer C dense film without UV treatment provide $O_2/N_2$ selectivity $(\alpha_{O2/N2})<4$. Furthermore, Table 5 shows that as the testing temperature increases, the $O_2/N_2$ selectivity decreases from about 2.34 at 30° C. to about 1.77 at 100° C.

TABLE 5

Air separation performance of Polymer C dense film under different testing conditions

| Dense film | $P_{air}$ (Barrer) | $P_{O2}$ (Barrer)[g] | $\alpha_{O2/N2}$[h] |
|---|---|---|---|
| Polymer C[a] | 5.80 | 11.6 | 2.49 |
| Polymer C[b] | 4.85 | 9.26 | 2.34 |
| Polymer C[c] | 5.97 | 12.2 | 2.58 |
| Polymer C[d] | 7.18 | 13.7 | 2.34 |
| Polymer C[e] | 9.68 | 15.2 | 1.77 |

[a]Tested at 50° C., 100 psig
[b]Tested at 30° C., 30 psig.
[c]Tested at 50° C., 30 psig.
[d]Tested at 70° C., 30 psig.
[e]Tested at 100° C., 30 psig.
[g]$O_2$ permeability: $P_{O2}$, $O_2/N_2$ selectivity: $\alpha_{O2/N2}$, calculated from GC results and permeation results: $P_{O2} = P_{air}/(X_{O2} + (1 - X_{O2})/\alpha_{O2/N2})$
[h]$\alpha_{O2/N2} = (y_{O2}/y_{N2}) \cdot (x_{N2}/x_{O2})$ On the other hand, UV crosslinked Polymer C dense films may provide a sheath layer having significantly enhanced $O_2/N_2$ selectivity compared to the uncrosslinked Polymer C dense film as shown in Table 6 below.

TABLE 6

Air separation performance of UV-crosslinked Polymer C dense film

| Dense film | $P_{air}$ (Barrer) | $P_{O2}$ (Barrer)[g] | $\alpha_{O2/N2}$[h] |
|---|---|---|---|
| Polymer C[e] | 9.68 | 15.2 | 1.77 |
| Polymer C-UV 10 min[f] | 6.82 | 17.9 | 3.91 |
| Polymer C-UV 20 min[f] | 5.05 | 14.7 | 4.75 |
| Polymer C-UV 30 min[f] | 4.34 | 12.9 | 4.97 |

[e]Tested at 100° C., 30 psig.
[f]Tested at 100° C., 150 psig.
[g]Calculated from GC results and permeation results: $P_{O2} = P_{air}/(X_{O2} + (1 - X_{O2})/\alpha_{O2/N2})$
[h]$\alpha_{O2/N2} = (y_{O2}/y_{N2}) \cdot (x_{N2}/x_{O2})$

EXAMPLE 4

General Procedure for Fiber Spinning

Three solutions were prepared for use in hollow fiber membrane spinning. The first solution was the Bore Solution and contained 10% water in NMP. The second solution was the Core Solution, and contained a 30% solution of Ultem polyetherimide dissolved in 8:1 NMP: triethylene glycol. The third solution was the Sheath Solution, and contained 15% Polymer C dissolved in a solvent mixture comprising a mixture of solvents and non-solvents for Polymer C. The solvents used were a 1:1 mixture of 1,3-dioxolane and NMP, and the non-solvents used were a 2:1 mixture of acetone and methanol. The solvent:non-solvent ratio was 2.6.

The three solutions were pumped into the appropriate orifices of the spinneret. The Bore Solution was pumped through the center opening at a rate of 0.2-0.6 mL/min. The Core Solution was pumped through the inner annular orifice at a rate of 0.5 g/min. The Sheath Solution was pumped through the outer annular orifice at a rate of 0.09 g/min. The liquid stream so generated was allowed to fall from the spinneret to the water bath through a distance of 2-10 cm, and was then passed under rollers in the water bath for a distance of approximately 6 feet. In the water bath, the liquid stream coagulated into a white fiber. This fiber was taken up on a drum rotating at a rate of <9 rpm, the rate having been adjusted to leave a small amount of slack in the fiber as it is drawn through the water bath. After sufficient fiber was collected, the fiber was soaked in water overnight, and then washed in three successive baths of methanol (30 minutes each) and three successive baths of hexane (30 minutes each). It was then dried in an oven at 160° C.

Some samples were UV-crosslinked by suspending them in the center of a Rayonet reactor equipped with UV-C bulbs and the irradiation time was 2-40 minutes.

For analysis, approximately 30 fibers were mounted in a short module by potting the two ends with epoxy in such a way that an open path remained to the hollow centers of each fiber. The test module so prepared was placed in an oven at 100° C., and air was admitted to one end at a pressure of 30 psi. Nitrogen-enriched air (NEA) was produced at the opposite end of this module, while Oxygen-enriched air (OEA) exited a permeate hole drilled in the side of the module.

Permeance and selectivity were calculated from the flow rates of incoming air, NEA and OEA, and the concentrations of oxygen in each of these streams using the equations below:

$$1 GPU = \frac{10^{-6} cm^3 (STP)}{cm^2 s (cm\, Hg)} \quad (1)$$

$$Perm_{O2} = \frac{F_p(C_p)}{A(p_1 - p_2)} \quad (2)$$

where $$p_1 = (\Delta P + P_{atm})\left(\frac{C_r + C_i}{2}\right) \quad (3)$$

$$p_2 = (P_{atm})(C_p) \quad (4)$$

$$\alpha = \frac{Perm_{O2}}{Perm_{N2}} \quad (5)$$

wherein
F=flow;
C=concentration of oxygen or nitrogen;
P=pressure;
i, r, and p refer to the inlet, retentate and permeate ports.
Nitrogen permeability is calculated using analogous equations and assuming that the percentage of nitrogen is 100-C;
Perm=permeance and
α=selectivity.

Figure 7:
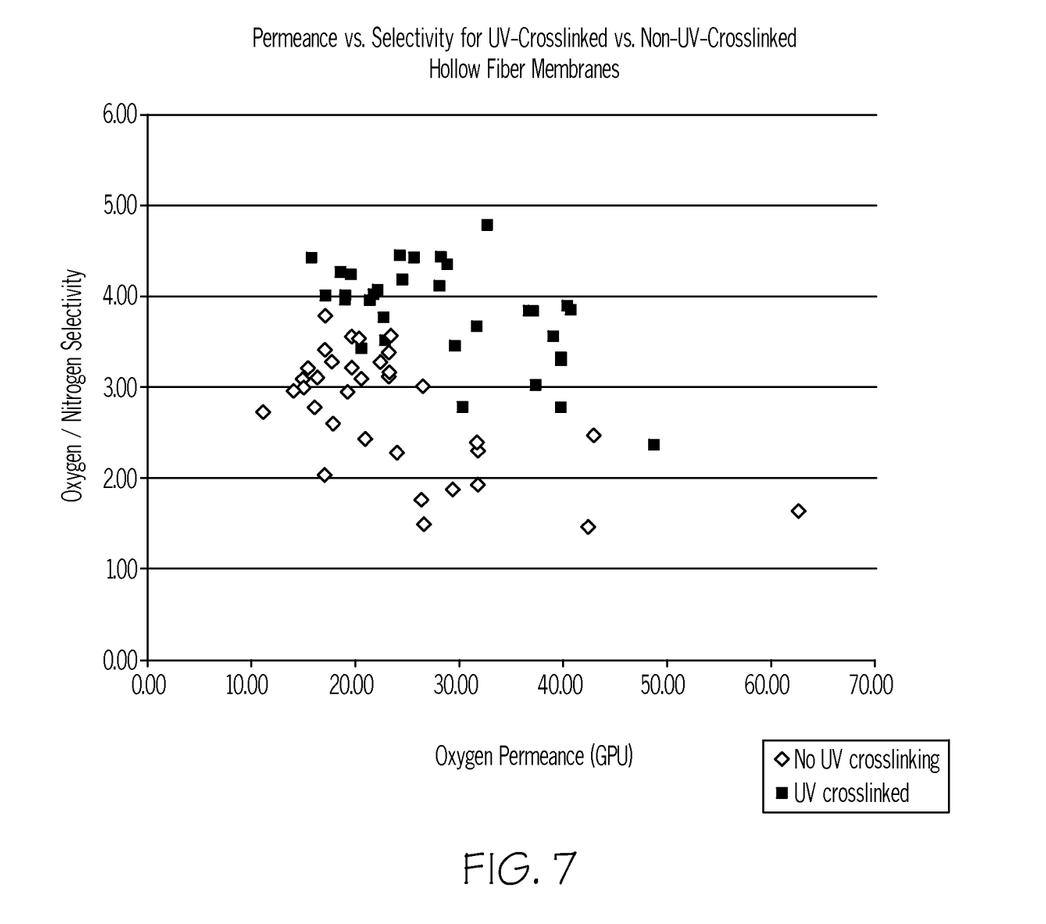
FIG. 7 is a graph showing a comparison of UV-crosslinked vs. non-UV-crosslinked hollow fiber membranes.

FIG. 7 shows a comparison of UV-crosslinked vs. Non-UV-crosslinked hollow fiber membranes. Oxygen/nitrogen selectivity is plotted vs. Oxygen permeance. It was observed that the UV-crosslinked membranes showed higher selectivity than the non-UV-crosslinked samples. It was also noted that most membranes had selectivities higher than the 1.77 value noted in Table 6 for dense film permeabilities. Since permeabilities are an inherent polymer property, this result implies that a chemical change has occurred during the process of fiber spinning which has increased the selectivity of the fiber. This surprising result is not anticipated by the prior art.

EXAMPLE 5

Temperature Dependence of Permeance and Selectivity Data

Figure 8:
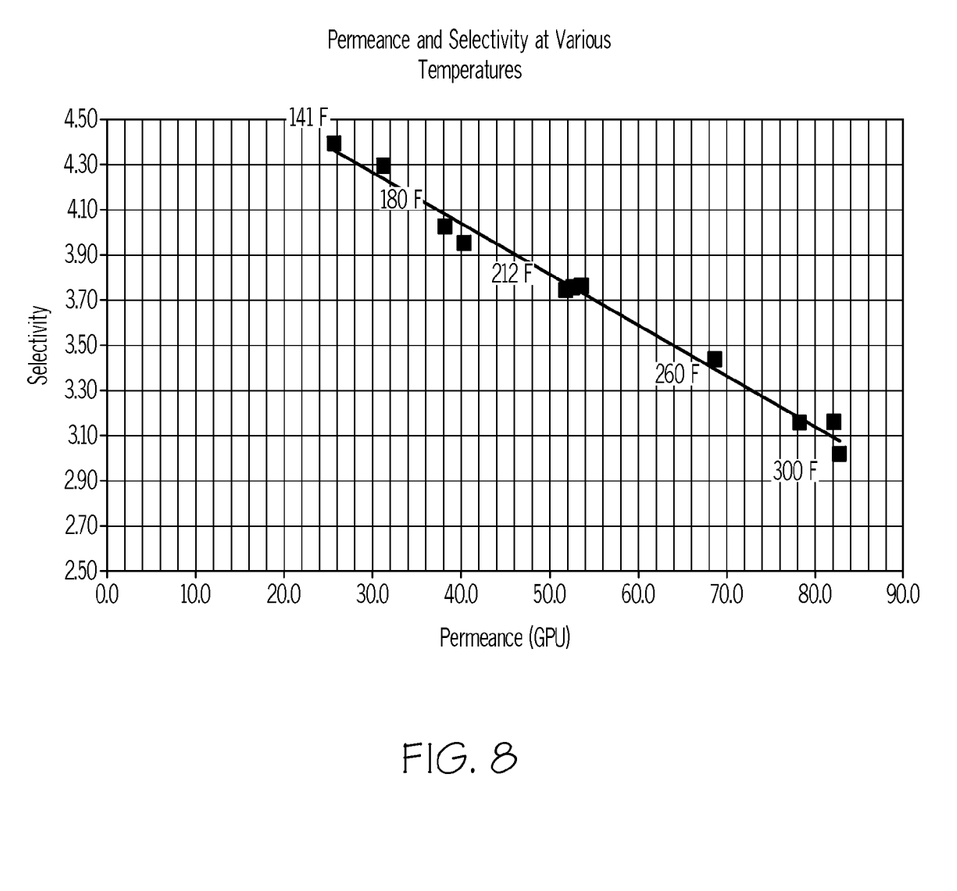
FIG. 8 is a graph showing the oxygen permeance and oxygen/nitrogen selectivity of a membrane of the present invention as a function of temperature.

A hollow fiber membrane module, prepared using the same general procedure as in Example 4, but with polyethersulfone as the core polymer instead of Ultem polyetherimide, was tested for the ability to separate oxygen from nitrogen at various temperatures. FIG. 8 shows the oxygen permeance and oxygen/nitrogen selectivity for this membrane as a function of temperature. It is seen that as the temperature increases, the permeance of the membrane also increases, and the selectivity decreases. The dependence of permeance and selectivity on temperature makes many air separation membranes unsuitable for aircraft applications.

As can be appreciated by those skilled in the art, the present invention provides improved gas separation membranes. Embodiments of the present invention provide low cost separation membranes for use in fuel tank inerting systems. The core and sheath layers of the present invention can be separately optimized.

It should be understood, of course, that the foregoing relates to exemplary embodiments of the invention and that modifications may be made without departing from the spirit and scope of the invention as set forth in the following claims.

We claim:

1. A film composite hollow fiber membrane comprising:
   a porous core polymer layer comprising at least one polymer; and
   a sheath crosslinked polymer layer adjacent to said porous core polymer layer, wherein said sheath crosslinked polymer layer has a selective layer and comprises at least one crosslinked polymer that is a different polymer from said at least one polymer in said porous core polymer layer;
   wherein said sheath crosslinked polymer layer comprises between about 5% and about 20% by weight of the film composite hollow fiber membrane.

2. The film composite hollow fiber membrane of claim 1, wherein said porous core polymer layer comprises polyetherimide.

3. The film composite hollow fiber membrane of claim 1, wherein said film composite hollow fiber membrane has an oxygen permeance of at least 60 GPU.

4. The film composite hollow fiber membrane of claim 1, wherein said sheath crosslinked polymer layer is positioned radially outward from said porous core polymer layer.

5. The film composite hollow fiber membrane of claim 1, wherein said porous core polymer layer has a glass transition temperature of at least 300° F.

6. The film composite hollow fiber membrane of claim 1, wherein said crosslinked polymer in the sheath crosslinked polymer layer further comprises an alkyl substituent and an aryl ketone.

7. The film composite hollow fiber membrane of claim 6, wherein the aryl ketone is selected from
   a UV-absorbing group with a UV extinction coefficient above $1000 M^{-1} cm^{-1}$ at 254 nm; and
   an alkyl group which is a $C_1$-$C_8$ straight or branched chain saturated hydrocarbon.

8. A film composite hollow fiber gas separation membrane comprising:
   a porous core polymer layer; and
   a sheath UV-crosslinked polymer layer positioned radially outward from said porous core polymer layer, wherein said sheath UV-crosslinked polymer layer has a nonporous selective layer and comprises at least one UV-crosslinked polymer that is a different polymer from a polymer in the said porous core polymer layer, and
   wherein the sheath polymer layer includes an outside skin and an underlying portion,
   wherein the outside skin is less porous than the underlying portion.

9. The film composite hollow fiber gas separation membrane of claim 8, wherein said sheath UV-crosslinked polymer layer has an asymmetric structure.

10. The film composite hollow fiber gas separation membrane of claim 8, wherein said UV-crosslinked polymer in the sheath UV-crosslinked polymer layer a) is different from said polymer in the said porous core polymer layer; and b) is formed from a UV-cross-linkable rigid, glassy polymer under UV radiation.

11. The film composite hollow fiber gas separation membrane of claim 10, wherein said UV-cross-linkable rigid, glassy polymer is selected from the group consisting of polyacrylates; polyimides; polyimide synthesized by co-polymerization of 1,2,4,5-benzentetracarboxylic dianhydride, 3,3',4,4'-benzophenonetetracarboxylic dianhydride, and 4,4'-methylenebis(2,6-dimethylaniline) monomers; polyimide synthesized by co-polymerization of 3,3',4,4'-benzophenonetetracarboxylic dianhydride, pyromellitic dianhydride, and 4,4'-diamino-3,3',5,5'-tetramethyldiphenylmethane; polyimide synthesized by co-polymerization of 3,3',4,4'-benzophenone tetracarboxylic dianhydride, pyromellitic dianhydride, 4,4'-oxydiphthalic anhydride, and 3,3',5,5'-tetramethyl-4,4'-methylene dianiline; poly(styrenes); styrene-containing copolymers; polysulfone; and polyethersulfone.

12. The film composite hollow fiber gas separation membrane of claim 10, wherein said UV-cross-linkable rigid, glassy polymer comprises:
   a UV-absorbing group with a UV extinction coefficient above $1000 M^{-1} cm^{-1}$ at 254 nm; and
   an alkyl group which is a $C_1$-$C_8$ straight or branched chain saturated hydrocarbon.

* * * * *